United States Patent [19]

Krawczyk et al.

[11] 4,431,563

[45] Feb. 14, 1984

[54] INHIBITORS FOR ACID GAS CONDITIONING SOLUTIONS

[75] Inventors: Leroy S. Krawczyk; Charles W. Martin; Roscoe L. Pearce, all of Lake Jackson, Tex.

[73] Assignee: The Dow Chemical Company, Midland, Mich.

[21] Appl. No.: 400,340

[22] Filed: Jul. 21, 1982

[51] Int. Cl.$^3$ .................. C23F 11/14; C23F 11/16; C23F 11/18

[52] U.S. Cl. .................. 252/189; 106/14.13; 106/14.14; 106/14.15; 106/14.21; 106/14.42; 106/14.44; 252/389 R; 422/16; 422/19; 423/228; 423/229

[58] Field of Search .............. 252/189, 389.5, 389.51, 252/389.52, 389.53, 389.61; 106/14.13, 14.14, 14.15, 14.21, 14.42, 14.44; 422/16, 19; 423/228, 229

[56] References Cited

U.S. PATENT DOCUMENTS

| | | | |
|---|---|---|---|
| 3,625,888 | 12/1971 | Redmore et al. | 252/389.53 |
| 3,632,519 | 1/1972 | Gustafson | 252/189 |
| 4,071,470 | 1/1978 | Davidson et al. | 252/389.53 |
| 4,096,085 | 6/1978 | Holoman et al. | 252/189 |
| 4,100,100 | 7/1978 | Clouse et al. | 252/189 |
| 4,102,804 | 7/1978 | Clouse et al. | 252/189 |
| 4,143,119 | 3/1979 | Asperger | 252/189 |
| 4,330,421 | 5/1982 | Braid | 252/389.53 |

*Primary Examiner*—Irwin Gluck
*Attorney, Agent, or Firm*—B. G. Colley

[57] ABSTRACT

The corrosion of ferrous metal surfaces in gas conditioning apparatus is inhibited by using a gas conditioning solution such as aqueous alkanolamines which contain thionitrogen compounds such as metal thiocyanates or thioamides. After recycling the gas conditioning solution for a few days, the solution dissolves sufficient amounts of nickel or cobalt or other metals in the equipment to act as a synergist with the thionitrogen compounds. In the event, the equipment does not contain any soluble synergistic metals, these metals may be added to the gas conditioning solution as soluble metal salts. Examples of useful additive metals are cobalt, nickel, calcium, copper, chromium, zinc, tin, aluminum, and magnesium.

25 Claims, No Drawings

INHIBITORS FOR ACID GAS CONDITIONING SOLUTIONS

BACKGROUND OF THE INVENTION

This invention relates to corrosion inhibiting compositions for use in acid gas removal equipment and methods for their use.

It is well known from the prior art that acid gases such as carbon dioxide, hydrogen sulfide and carbonyl sulfide can be removed from gaseous feed streams such as natural gas and synthesis gas using dilute aqueous solutions of potassium carbonate, alkanolamines such as monoethanolamine, diethanolamine, and methyl diethanolamine, and other weak bases. The usual procedure to use a contactor wherein the absorbent solution contacts the feed stream and to use a regenerator with a reboiler wherein the rich absorbent containing the acid gas components is regenerated back to the free absorbent. The solution is then recycled back to the contactor for reuse.

There has been much activity devoted to solving the problem of metallic corrosion in the equipment used in the above process. This problem is particularly acute and/or chronic when mild steel alloys are used in the equipment to save on capital costs over the use of more exotic and expensive metal alloys such as stainless steel. It is, of course, common practice to use stainless steel and nickel alloys in sensitive areas such as heat exchange equipment.

U.S. Pat. No. 3,087,778 (Apr. 30, 1963) provides for inhibition of potassium carbonate solutions by using 1,000 to 5,000 p.p.m. of the trivalent oxides of arsenic, antimony or bismuth.

U.S. Pat. No. 3,808,140 (Apr. 30, 1974) provides for inhibition of alkanolamine solution by using minor amounts of vanadium and antimony compounds.

U.S. Pat. No. 3,896,044 (July 22, 1975) provides for inhibition of alkanolamine solutions by using minor amounts of nitro substituted aromatic acids or salts thereof.

U.S. Pat. No. 3,959,170 (May 25, 1976) provides for inhibition of alkanolamine solutions using a minor amount of a stannous salt.

U.S. Pat. No. 4,071,470 (Jan. 31, 1978) provides for inhibition of alkanolamine solutions using a minor amount of the reaction product of copper, sulfur, and an alkanolamine.

U.S. Pat. No. 4,096,085 (June 20, 1978) provides for inhibition of alkanolamine solutions using minor amounts of a polyamine, with or without copper, and sulfur.

U.S. Pat. No. 4,100,099 (July 11, 1978) provides for inhibition of sour gas conditioning fluids using minor amounts of quaternary pyridinium salts and alkylene polyamines.

U.S. Pat. No. 4,100,100 (July 11, 1978) provides for inhibition of sour gas conditioning fluids using minor amounts of quaternary pyridinium salts, thiocyanate compounds or thioamide compounds, and divalent cobalt compounds.

U.S. Pat. No. 4,102,804 (July 25, 1978) provides for inhibition of sour gas conditioning solutions using minor amounts of a quaternary pyridinium salt, and a thiocyanate compound, a sulfide compound or a thioamide compound.

U.S. Pat. No. 4,116,629 (Sept. 26, 1978) provides for the corrosion inhibition of stainless steels (types 410 and 430) when in contact with carbonate solutions by using nickel salts.

U.S. Pat. No. 4,143,119 (Mar. 6, 1979) provides for inhibition of sour gas conditioning solutions using minor amounts of copper and a polysulfide generated in situ.

While the above compositions are effective, they each have various defects which detract from their universal use. For example, compounds of arsenic, antimony and vanadium are known to be toxic and their use presents waste disposal problems for the plant operators. The use of the quaternary pyridinium compounds are known to cause a foaming problem in certain instances.

SUMMARY OF THE INVENTION

It now has been discovered that the corrosion of iron and steel in gas removal equipment can be effectively reduced by using a gas conditioning solution such as aqueous alkanolamines inhibited by effective amounts of a soluble thionitrogen compound.

It is believed that inhibition results from the interaction between the thionitrogen compound and the metals naturally present in the used gas removal solution.

In the event, the metals are lacking, the gas condition solution can be modified by the inclusion of effective amounts of one or more soluble nickel, cobalt, calcium, copper, chromium, zinc, tin, aluminum, or magnesium compounds.

The inhibitors are constantly replenished or maintained in the gas conditioning solution in order to obtain effective passivation.

The combination of inhibitors claimed herein are unique in that they reduce corrosion of all ferrous surfaces, i.e., not only mild steel but also stainless steel surfaces except for stainless steels of the 400 series.

DETAILED DESCRIPTION OF THE INVENTION

The inhibitors of this invention are particularly effective in aqueous solutions of alkanolamines such as monoethanolamine, diethanolamine, methyldiethanolamine and related alkanolamines that are commonly used to remove acid gases from gas streams.

The impure gaseous/liquid feed streams which can be treated with the inhibited gas conditioning solutions of this invention to remove carbon dioxide can generally contain no more than a few (1–5 ppm) of $H_2S$ and/or carbonyl sulfide and 500 ppm or less of oxygen. Several hundred cubic feet of a feed gas containing (300 ppm or less) of $H_2S$ can be treated with the inhibited gas conditioning solutions of this invention by a simple test to select the proper metal synergist. For example metals that form insoluble sulfides generally do not give corrosion protection.

Examples of useful soluble nickel compounds are nickelous sulfate, nitrate, acetate, tartrate and citrate.

Examples of useful soluble cobalt salts are cobaltous halides such as the chloride, fluoride, and bromide, cobaltous sulfate, cobaltous nitrate, cobaltous acetate, and cobaltous benzoate.

The other metals useful herein are used in the form of their related soluble salts.

Examples of useful soluble thionitrogen compounds are alkali metal thiocyanates such as potassium thiocyanate and sodium thiocyanate and metal thiocyanates such as copper thiocyanate and nickel thiocyanate.

Ammonium thiocyanate is also useful and is the preferred species.

Other examples of soluble thionitrogen compounds are thioamides having the formula $$A-C(S)-N(R)_2$$

where
- A is a hydrocarbon radical of 1-6 carbons or a pyridyl radical,
- R is a hydrogen atom or an alkyl group of 1-4 carbons.

Specific examples of the thioamides are thioacetamide, N,N'diethyl thioacetamide, thiobenzamide, N,N'dimethyl thioacetamide, thiocapramide, N,N'diethyl thiocapramide, and thionicotinamide.

It is to be noted that the terms soluble compound means for the purpose of this invention that the compound is sufficiently soluble in the aqueous gas conditioning solution, i.e., aqueous alkanolamine to be useful herein.

It has been found that the thionitrogen inhibitors must be maintained in the gas conditioning solutions in amounts from 50 and preferably 100 or more parts per million. Since these compounds are depleted during use, large amounts such as 500 or more p.p.m. can be used at start-up and periodic additions can be made thereafter to maintain the required effective amounts in the solution. A range from 50 to 1,000 ppm has been found to be an effective amount and a range from 100 to 300 ppm is the preferred range.

It has been found that when a fresh charge of the gas conditioning solution containing thionitrogen is used in a gas conditioning plant containing various metal alloys there is a period of time of about 2-4 days in which the solution must be circulated before passivation takes place. It is believed that the gas conditioning solution dissolves sufficient trace metals to act as a synergist with the thionitrogen compounds.

In the applications of this invention wherein the gas conditioning equipment is constructed solely of mild steel, one usually must add one or more of the above metal salts in the manner indicated above.

The following examples are presented to illustrate but not limit the invention.

EXAMPLE 1

In a gas conditioning plant wherein a hydrogen gas stream of 50 million cubic feet per day at 300 pounds per square inch pressure and containing 18 percent $CO_2$ was contacted with an aqueous solution of 18 percent by weight of monoethanol amine and the rich amine solution was regenerated in a stripping column with a reflux boiler and the lean solution was pumped back to the contactor. Suitable cross exchangers were used.

Stainless steel (304) and monel components were used in the heat exchangers.

Corrosion probes and metal coupons of the same metals used in the plant were placed in the cool rich amine solution, the hot rich solution and the hot lean solutions. The probes were adjusted to read the corrosion rate in mils per year (mpy).

The base corrosion rate without inhibitor on carbon steel in the hot rich amine circuit was 740 mpy.

The base corrosion rate without inhibitor on 304 stainless steel was 12 mpy.

The base corrosion rate without inhibitor on Monel 400 was less than 2 mpy.

After addition of 200 ppm of ammonium thiocyanate, the carbon steel corrosion rate dropped to less than 2 mpy and the corrosion rate for stainless steel and Monel dropped to less than one mpy.

The amine concentration was then increased from 18% to 25% and the corrosion rates remained the same.

EXAMPLE 2

In a plant wherein $CO_2$ was removed from a flue gas, using 18-25% monoethanolamine (MEA), the feed gas contained from 0 to 500 ppm of oxygen and the MEA solution contained 1-5 ppm nickel in solution. The corrosion rate was found to be about 100 mpy for carbon steel. A heavy metal corrosion inhibitor was initially used to reduce the corrosion rate. Ammonium thiocyanate at the rate of 200 ppm was added to replace the heavy metal. It was found that the corrosion rate remained in a range of 1-3 mpy with the MEA solution range varying from 18-25%.

EXAMPLE 3

In a similar plant to the one set forth in Example 2, ammonium thiocyanate at the rate of 250 ppm was added as a heavy metal replacement and the corrosion rate remained at 1-3 mpy.

EXAMPLE 4

In a hydrogen gas purification plant using 18-25% monethanolamine solutions, the base corrosion rate for carbon steel without inhibitor was 350 mpy in the hot rich circuit.

The base corrosion rate for 304 stainless steel was 50 mpy in the hot rich and lean circuits.

After ammonium thiocyanate at 200 ppm was added, the corrosion rates dropped to less than 2 mpy for both metals.

EXAMPLE 5

In a plant similar to Example 4, containing less than one ppm nickel in the monoethanolamine solution, the base corrosion rate without inhibitor was found to be 140 mpy for carbon steel and 10 mpy for 304 stainless steel.

After 300 ppm ammonium thiocyanate and 50 ppm cobalt sulfate was added to the MEA solution, the corrosion rate for carbon steel dropped to 15 mpy and the corrosion rate for stainless steel dropped to 8-10 mpy.

EXAMPLE 6

In a plant for the removal of $CO_2$ from natural gas using a 30% MEA solution using all carbon steel equipment, the base corrosion rate was found to be 60 mpy in the hot lean circuit.

After the addition of 200 ppm of ammonium thiocyanate, the corrosion rate dropped to 30-40 mpy. Sometime later, 3 ppm of nickel sulfate ($Ni_2SO_4$) was added and the corrosion rate dropped to less than 2 mpy.

EXAMPLE 7

In a natural gas purification plant similar to Example 6, using 16% MEA, the base corrosion rate for carbon steel was found to be 12 mpy in the MEA stripper section. The base corrosion rate for 304 stainless steel was found to be 12 mpy.

After the addition of 200 ppm of ammonium thiocyanate, these corrosion rates changed to 7 mpy and 36 mpy respectively. After the addition of 7 ppm of nickel sulfate ($Ni_2SO_4$) both these corrosion rates dropped to 0.1 mpy.

The MEA concentration was then increased to 27% with the above combination of ammonium thiocyanate and nickel sulfate. The corrosion rates changed to 0.1 mpy (carbon steel) and 0.6 mpy (stainless steel).

EXAMPLE 8

In a hydrogen gas purification plant using 16-27% MEA solutions, the base corrosion rate for carbon steel and 304 stainless steel was found to be 70 mpy and 15 mpy respectively.

This rate was reduced to less than 2 mpy for both metals using an arsenic inhibitor.

When the above inhibitor was replaced with 200 ppm of ammonium thiocyanate and 5 ppm nickel sulfate, the corrosion rate for both metals remained at less than 2 mpy.

From the foregoing, it is seen that the use of thiocyanate compounds greatly reduces the corrosion rate of the mild steel equipment used therein when the equipment also contains stainless steel or nickel alloys therein.

EXAMPLES 9-103

The effectiveness of the corrosion inhibitors of this invention were determined in a static coupon corrosion test. In this test a solution of 25 and 30 percent by weight of monoethanol amine (MEA) in deionized water was saturated with $CO_2$. This solution simulates a rich amine solution commonly found in gas conditioning plants.

About 350 ml of this solution with inhibitors is then placed in a 2" by 10" Teflon-lined steel cylinder, prepared mild steel test coupons were inserted, and the cylinder was sealed and bolted shut.

The cylinder and its contents were then heated to 121° C. (250° F.) for 24 hours. The coupons were then removed, cleaned and weighed. The corrosion rate in mils per year (MPY) is calculated from the following equation $$MPY = \frac{(1.44/\text{metal density in gms/cm}^3)(\text{weight loss in mgs})}{(\text{surface area in dm}^2)(\text{time in days})}$$

In the manner set forth above, Tables I-VIII give the corrosion rate using mild steel (1020 MS) at 121° C. (250° F.) over a 24-hour period. The inhibitors used in these tests were known salts such as ammonium thiocyanate, nickel sulfate, cobalt sulfate, zinc sulfate, copper carbonate and calcium sulfate. In each example, the run was usually in duplicate and the reported corrosion rate is the average of the two runs. Single runs are noted as (SR).

TABLE I

25% Monoethanolamine + SCN + Cobalt Sulfate

| Example | Inhibitor | Corrosion Rate in M.P.Y. |
|---|---|---|
| Control* | None | 35.0 |
| 9 | 5 ppm $Co^{+2}$ + 200 ppm $SCN^-$ | 5.5 |
| 10 | 10 ppm $Co^{+2}$ + 200 ppm $SCN^-$ | 3.8 |
| 11 | 20 ppm $Co^{+2}$ + 200 ppm $SCN^-$ | 1.9 |
| 12 | 35 ppm $Co^{+2}$ + 200 ppm $SCN^-$ | 2.7 |
| 13 | 100 ppm $Co^{+2}$ + 200 ppm $SCN^-$ | 4.1 |
| 14 | 200 ppm $Co^{+2}$ + 200 ppm $SCN^-$ | 4.2 |

*Average of 28 runs.

TABLE II

25% Monoethanolamine + SCN + Nickel Sulfate

| Example | Inhibitor | Corrosion Rate in M.P.Y. |
|---|---|---|
| Control 1* | None | 35.0 |
| 15 | 10 ppm $Ni^{+2}$ + 100 ppm $SCN^-$ | 3.45 |
| 16 | 20 ppm $Ni^{+2}$ + 100 ppm $SCN^-$ | 2.55 |
| 17 | 35 ppm $Ni^{+2}$ + 100 ppm $SCN^-$ | 2.35 |
| 18 | 35 ppm $Ni^{+2}$ + 200 ppm $SCN^-$ | 3.05 |
| 19 | 35 ppm $Ni^{+2}$ + 200 ppm $SCN^-$ | 2.15 |
| 20 | 35 ppm $Ni^{+2}$ + 200 ppm $SCN^-$ | 2.55 |
| 21 | 200 ppm $Ni^{+2}$ + 200 ppm $SCN^-$ | 2.4 |

*Average of 28 runs

TABLE III

25% MEA, SCN, Calcium

| Example | Inhibitor** | Corrosion Rate in M.P.Y. |
|---|---|---|
| Control 1* | None | 35.0 |
| 22 | 5 ppm $Ca^{+2}$ + 200 ppm $SCN^-$ | 9.0 |
| 23 | 10 ppm $Ca^{+2}$ + 200 ppm $SCN^-$ | 16.0 |
| 24 | 20 ppm $Ca^{+2}$ + 200 ppm $SCN^-$ | 0.785 |
| 25 | 35 ppm $Ca^{+2}$ + 200 ppm $SCN^-$ | 2.55 |
| 26 | 35 ppm $Ca^{+2}$ + 200 ppm $SCN^-$ | 12.5 |
| 27 | 35 ppm $Ca^{+2}$ (chloride) + 200 ppm $SCN^-$ | 22.3 |
| 28 | 35 ppm $Ca^{+2}$ (borate) + 200 ppm $SCN^-$ | 0.9 |
| 29 | 100 ppm $Ca^{+2}$ + 200 ppm $SCN^-$ | 9.4 |
| 30 | 200 ppm $Ca^{+2}$ + 200 ppm $SCN^-$ | 7.25 |
| 31 | 100 ppm $Ca^{+2}$ + 100 ppm $SCN^-$ | 8.55 |

*Average of 28 runs
**All runs used calcium sulfate except where noted.

TABLE IV

25% MEA, SCN, Copper, Chromium, Tin or Zinc

| Example | Inhibitor | Corrosion Rate in M.P.Y. |
|---|---|---|
| Control 1* | None | 35.0 |
| 32 | 200 ppm $Cu^{+2}$ + 200 ppm $SCN^-$ | 5.5 |
| 33 | 10 ppm $Cu^{+2}$ + 200 ppm $SCN^-$ | 0.335 |
| 34 | 10 ppm $Cu^{+2}$ + 100 ppm $SCN^-$ | 7.7 |
| 35 | 5 ppm $Cu^{+2}$ + 100 ppm $SCN^-$ | 10.0 |
| 36 | 200 ppm $Cr^{+3}$ + 200 ppm $SCN^-$ | 14.8 |
| 37 | 200 ppm $Sn^{+4}$ + 200 ppm $SCN^-$ | 18.0 |
| 38 | 200 ppm $Zn^{+2}$ + 200 ppm $SCN^-$ | 6.95 |

*Average of 28 runs.

TABLE V

25% MEA, SCN, 2 or More Metals*

| Example | Inhibitor | Corrosion Rate in M.P.Y. |
|---|---|---|
| Control 2** | None | 35.0 |
| 39 | 20 $Cu^{+2}$ + 20 $Ni^{+2}$ + 100 $SCN^-$ | 22.75 |
| 40 | 10 $Cu^{+2}$ + 10 $Ni^{+2}$ + 100 $SCN^-$ | 19.45 |
| 41 | 20 $Cu^{+2}$ + 20 $Ni^{+2}$ + 200 $SCN^-$ | 10.6 |
| 42 | 10 $Cu^{+2}$ + 10 $Ni^{+2}$ + 200 $SCN^-$ | 5.85 |
| 43 | 20 $Ni^{+2}$ + 20 $Ca^{+2}$ + 200 $SCN^-$ | 2.7 |
| 44 | 20 $Ni^{+2}$ + 5 $Cu^{+2}$ + 200 $SCN^-$ | 7.7 |
| 45 | 35 $Ca^{+2}$ + 50 $Fe^{+2}$ + 200 $SCN^-$ | 8.75 |
| 46 | 35 $Ca^{+2}$ + 50 $Ni^{+2}$ + 200 $SCN^-$ | 2.7 |
| 47 | 35 $Ca^{+2}$ + 20 $Ni^{+2}$ + 50 $Fe^{+2}$ + 200 $SCN^-$ | 1.4 |
| 48 | 35 $Ca^{+2}$ + 50 $Co^{+2}$ + 200 $SCN^-$ | 2.5 |
| 49 | 35 $Ca^{+2}$ + 20 $Co^{+2}$ + 200 $SCN^-$ | 2.25 |
| 50 | 35 $Co^{+2}$ + 35 $Ca^{+2}$ + 200 $SCN^-$ | 0.9 |
| 51 | 35 $Co^{+2}$ + 5 $Ca^{+2}$ + 200 $SCN^-$ | 0.9 |
| 52 | 20 $Co^{+2}$ + 35 $Ca^{+2}$ + 200 $SCN^-$ | 1.65 |
| 53 | 20 $Co^{+2}$ + 5 $Ca^{+2}$ + 200 $SCN^-$ | 1.75 |
| 54 | 10 $Co^{+2}$ + 35 $Ca^{+2}$ + 200 $SCN^-$ | 3.15 |
| 55 | 10 $Co^{+2}$ + 5 $Ca^{+2}$ + 200 $SCN^-$ | 3.55 |
| 56 | 5 $Co^{+2}$ + 35 $Ca^{+2}$ + 200 $SCN^-$ | 1.75 |
| 57 | 5 $Co^{+2}$ + 5 $Ca^{+2}$ + 200 $SCN^-$ | 2.4 |
| 58 | 35 $Co^{+2}$ + 35 $Ca^{+2}$ + | 2.55 |

TABLE V-continued

25% MEA, SCN, 2 or More Metals*

| Example | Inhibitor | Corrosion Rate in M.P.Y. |
|---|---|---|
| 59 | 35 $Ni^{+2}$ + 200 $SCN^-$ 35 $Mg^{+2}$ + 35 ppm $Ca^{+2}$ + 200 $SCN^-$ | 17.45 |
| 60 | 35 $Al^{+3}$ + 35 $Ca^{+2}$ + 200 $SCN^-$ | 17.9 |
| 61 | 10 $Co^{+2}$ + 10 $Ni^{+2}$ + 10 $Ca^{+2}$ + 200 $SCN^-$ | 1.1 |

*Numbers are in parts per million (ppm).
**Average of 28 runs.

TABLE VI

30% MEA, SCN, Nickel

| Example | Inhibitor | Corrosion Rate in M.P.Y. | |
|---|---|---|---|
| Control 2* | None | 46.0 | |
| 62 | 100 ppm $SCN^-$ + 5 ppm $Ni^{+2}$ | 17.6 | (5 runs) |
| 63 | 100 ppm $SCN^-$ + 25 ppm $Ni^{+2}$ | 5.1 | (5 runs) |
| 64 | 100 ppm $SCN^-$ + 50 ppm $Ni^{+2}$ | 3.4 | (4 runs) |
| 65 | 100 ppm $SCN^-$ + 75 ppm $Ni^{+2}$ | 4.9 | (5 runs) |
| 66 | 100 ppm $SCN^-$ + 100 ppm $Ni^{+2}$ | 3.9 | (5 runs) |
| 67 | 100 ppm $SCN^-$ + 125 ppm $Ni^{+2}$ | 6.9 | (5 runs) |
| 68 | 100 ppm $SCN^-$ + 150 ppm $Ni^{+2}$ | 4.6 | (5 runs) |
| 69 | 100 ppm $SCN^-$ + 200 ppm $Ni^{+2}$ | 7.6 | (5 runs) |
| 70 | 200 ppm $SCN^-$ + 5 ppm $Ni^{+2}$ | 30.3 | (3 runs) |
| 71 | 200 ppm $SCN^-$ + 10 ppm $Ni^{+2}$ | 7.1 | (SR) |
| 72 | 200 ppm $SCN^-$ + 25 ppm $Ni^{+2}$ | 7.0 | (SR) |
| 73 | 200 ppm $SCN^-$ + 25 ppm $Ni^{+2}$ | 4.2 | (3 runs) |
| 74 | 200 ppm $SCN^-$ + 40 ppm $Ni^{+2}$ | 7.8 | (SR) |
| 75 | 200 ppm $SCN^-$ + 50 ppm $Ni^{+2}$ | 3.7 | (3 runs) |
| 76 | 200 ppm $SCN^-$ + 50 ppm $Ni^{+2}$ | 4.3 | (3 runs) |
| 77 | 200 ppm $SCN^-$ + 50 ppm $Ni^{+2}$ | 5.1 | (3 runs) |
| 78 | 200 ppm $SCN^-$ + 50 ppm $Ni^{+2}$ | 3.4 | |
| 79 | 200 ppm $SCN^-$ + 55 ppm $Ni^{+2}$ | 6.8 | (SR) |
| 80 | 200 ppm $SCN^-$ + 100 ppm $Ni^{+2}$ | 3.9 | (3 runs) |
| 81 | 200 ppm $SCN^-$ + 200 ppm $Ni^{+2}$ | 2.8 | (3 runs) |

*Average of 64 runs.

TABLE VII

30% MEA, 200 ppm SCN and Cobalt

| Example | Inhibitor | Corrosion Rate in M.P.Y. |
|---|---|---|
| Control 2* | None | 46.0 |
| 82 | 20 ppm $Co^{+2}$ + 200 ppm $SCN^-$ | 2.4 |
| 83 | 25 ppm $Co^{+2}$ + 200 ppm $SCN^-$ | 3.2 |
| 84 | 35 ppm $Co^{+2}$ + 200 ppm $SCN^-$ | 1.7 |
| 85 | 50 ppm $Co^{+2}$ + 200 ppm $SCN^-$ | 2.4 |
| 86 | 50 ppm $Co^{+2}$ + 200 ppm $SCN^-$ | 2.1 |
| 87 | 75 ppm $Co^{+2}$ + 200 ppm $SCN^-$ | 2.0 |
| 88 | 75 ppm $Co^{+2}$ + 200 ppm $SCN^-$ | 5.2 |
| 89 | 100 ppm $Co^{+2}$ + 200 ppm $SCN^-$ | 2.0 |

*Average of 64 runs.

TABLE VIII

30% MEA, SCN and 2 or More Metals*

| Example | Inhibitor | Corrosion Rate in M.P.Y. |
|---|---|---|
| Control 2** | None | 46.0 |
| 90 | 20 $Co^{+2}$ + 20 $Ca^{+2}$ + 200 $SCN^-$ | 5.8 |
| 91 | 35 $Co^{+2}$ + 35 $Ca^{+2}$ + 200 $SCN^-$ | 4.57 (4 runs) |
| 92 | 35 $Co^{+2}$ + 35 $Ca^{+2}$ + 200 $SCN^-$ | 2.2 |
| 93 | 50 $Co^{+2}$ + 50 $Ca^{+2}$ + 200 $SCN^-$ | 1.6 |
| 94 | 75 $Co^{+2}$ + 75 $Ca^{+2}$ + 200 $SCN^-$ | 1.9 |
| 95 | 100 $Co^{+2}$ + 100 $Ca^{+2}$ + 200 $SCN^-$ | 6.5 (4 runs) |
| 96 | 150 $Co^{+2}$ + 150 $Ca^{+2}$ + 200 $SCN^-$ | 5.2 |
| 97 | 200 $Co^{+2}$ + 200 $Ca^{+2}$ + 200 $SCN^-$ | 4.9 |
| 98 | 20 $Ni^{+2}$ + 200 $Zn^{+2}$ + 200 $SCN^-$ | 2.9 (SR) |
| 99 | 40 $Ni^{+2}$ + 200 $Zn^{+2}$ + 200 $SCN^-$ | 2.1 (SR) |
| 100 | 20 $Co^{+2}$ + 200 $Zn^{+2}$ + 200 $SCN^-$ | 6.2 (SR) |
| 101 | 50 $Cr^{+6}$ + 200 $Zn^{+2}$ + 200 $SCN^-$ | 22.6 (SR) |
| 102 | 10 $Ni^{+2}$ + 10 $Co^{+2}$ + 200 $Zn^{+2}$ + 200 $SCN^-$ | 1.9 (SR) |
| 103 | 40 $Ni^{+2}$ + 200 $Zn^{+2}$ + 200 $SCN^-$ | 2.6 (SR) |

*Numbers are in parts per million (ppm).
**Average of 64 runs.

EXAMPLES 104–106

A master batch of aqueous 30% monoethanolamine (MEA) was prepared for each series of experiments and saturated by passing $CO_2$ into it overnight. To 400 g portions of this $CO_2$ saturated MEA was added a sufficient amount of ammonium thiocyanate to yield 200 ppm of the thiocyanate ion in the final solution. In a similar manner 50 ppm $Ni^{+2}$ or $CO^{+2}$ was added in the form of $NiSO_4.6H_2O$ or $CoSO_4.7H_2O$ to some of the solutions following the addition of the thiocyanate. The solution was then divided into three approximately equal portions and placed in 4 ounce glass bottles containing a weighed 1020 mild steel coupon a surface area of 0.35 square decimeters.

All the samples were then placed in a Sparkler Filter (a water bath apparatus having a sealed lid) and pressurized to 30 psig with $CO_2$. The pressure was then raised to 45 psig with oxygen. The steam jacket of the water bath was then used to heat all the samples to 130° C. for 24 hours. When cool, the weight loss of each coupon was used to calculate the corrosion rate. The reported corrosion rates in Table IX represent the average of the three individual determinations.

TABLE IX

| Example | Inhibitor | Corrosion Rate in mpy |
|---|---|---|
| Control 3 | none | 38.2 |
| 104 | 200 ppm $SCN^-$ 50 ppm $Ni^{+2}$ | 2.5 |
| Control 4 | none | 47.5 |
| 105 | 200 ppm $SCN^-$ 50 ppm $Ni^{+2}$ | 5.8 |
| Control 5 | none | 36.5 |
| 106 | 200 ppm $SCN^-$ 50 ppm $Co^{+2}$ | 4.0 |

EXAMPLES 107–109

In a similar manner to that described in Examples 104–106, sufficient $Ni(SCN)_2$, $Cu(SCN)_2$ or $Co(SCN)_2.3H_2O$ was added to the $CO_2$ saturated MEA solution to yield a final concentration of 200 ppm $SCN^-$. The corrosion evaluation procedure was the same as in the preceeding examples. The results are set forth in Table X.

TABLE X

| Example | Inhibitor | Corrosion Rate in mpy |
|---|---|---|
| Control 6 | none | 36.5 |
| 107 | $Ni(SCN)_2$ | 3.3 |
| 108 | $Cu(SCN)_2$ | 1.1 |
| 109 | $Co(SCN)_2.3H_2O$ | 3.6 |

We claim:
1. A corrosion inhibited composition useful to inhibit corrosion in acid gas removal equipment using aqueous gas conditioning solutions which comprises

(A) a recirculated aqueous gas conditioning solution containing trace amounts of nickel, chromium or mixtures thereof and
(B) an effective amount of a thionitrogen compound wherein the thionitrogen compound is a water soluble thiocyanate or a water soluble thioamide having the formula

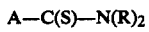
A—C(S)—N(R)$_2$ where
A is a hydrogen group of 1-6 carbons, and
R is a hydrogen atom or an alkyl group of 1-4 carbons.

2. The composition as set forth in claim 1 wherein the amount of said thionitrogen compounds is from 50 to 1,000 parts per million.

3. The composition as set forth in claim 1 wherein the amount of said thionitrogen compounds is in the range from 100 to 300 p.p.m.

4. A corrosion inhibited composition useful to inhibit corrosion in acid gas removal equipment using aqueous alkanol amine solutions which comprises
(A) a recirculated aqueous alkanol amine solution containing 10 to 50 percent by weight of alkanol amine and trace amounts of nickel, chromium or mixtures thereof, and
(B) an effective amount of a thionitrogen compound wherein the thionitrogen compound is a water soluble thiocyanate or a water soluble thioamide having the formula

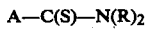
A—C(S)—N(R)$_2$ where
A is a hydrocarbon group of 1-6 carbons, and
R is a hydrogen atom or an alkyl group of 1-4 carbons.

5. The composition of claim 4 wherein the amount of said thionitrogen compounds is 50 to 1,000 parts per million.

6. The composition of claim 4 wherein the amount of said thionitrogen compounds is in the range from 100 to 300 p.p.m.

7. A corrosion inhibited composition useful to inhibit corrosion in carbon steel acid gas removal equipment using aqueous gas conditioning solutions which comprises
(A) an aqueous gas conditioning solution
(B) an effective amount of a thionitrogen compound wherein the thionitrogen compound is a water soluble thiocyanate or a water soluble thioamide having the formula

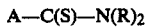
A—C(S)—N(R)$_2$ where
A is a hydrocarbon group of 1-12 carbons and
R is a hydrogen atom or an alkyl group of 1-4 carbons, and
(C) an effective amount of one or more of a soluble metal salt of a metal selected from the group consisting of cobalt, nickel, calcium, copper, chromium, zinc, tin, aluminum, and magnesium.

8. The composition as set forth in claim 7 wherein the amount of said thionitrogen compound is from 50 to 1,000 parts per million.

9. The composition as set forth in claim 7 wherein the amount of said thionitrogen compound is in the range from 100 to 300 p.p.m.

10. The composition as set forth in claim 7 wherein the amount of soluble salt is from 2 to 200 parts per million.

11. The composition as set forth in claim 7 wherein the thionitrogen compound is a water soluble thiocyanate.

12. The composition as set forth in claim 11 wherein the thiocyanate is ammonium thiocyanate.

13. The composition as set forth in claim 11 wherein the thiocyanate is an alkali metal thiocyanate.

14. The composition as set forth in claim 7 wherein the thionitrogen compound is a thioamide having the formula

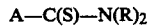
A—C(S)—N(R)$_2$ where
A is a hydrocarbon group of 1-12 carbons, and
R is a hydrogen or an alkyl group of 1-4 carbons.

15. The composition of claim 7 wherein the metal is cobalt.

16. The composition of claim 7 wherein the metal is nickel.

17. The composition of claim 11 wherein the metal is nickel.

18. The composition of claim 11 wherein the metal is cobalt.

19. A method for inhibiting corrosion of ferrous metal surfaces by gas conditioning solutions in acid gas removal equipment wherein said solutions are contacted with a gaseous feed stream containing CO$_2$ and H$_2$S with or without oxygen which comprises recirculating a gas conditioning solution containing a corrosion inhibiting amount of one or more of the thionitrogen compounds set forth in claim 1 through said removal equipment until a sufficient amount of metal from said equipment is dissolved therein before the said solution is contacted with said feed stream and maintaining in said solution a corrosion inhibiting amount of one or more of said thionitrogen compounds wherein said dissolved metal is nickel, chromium, or mixtures thereof.

20. The method as set forth in claim 19 wherein the amount of said compounds is 50 to 1,000 parts per million.

21. The method as set forth in claim 19 wherein the amount of said compounds is in the range from 100 to 300 p.p.m.

22. In the method of separating acid gases such as carbon dioxide from a gaseous hydrocarbon feed stream containing said acid gases in acid gas removal equipment by contacting said gaseous stream with a previously recirculated gas conditioning solution containing trace amounts of nickel, chromium or mixtures thereof at elevated pressure followed by regeneration of said solution at a lower pressure, the improvement which comprises inhibiting the corrosion of metal equipment used therein by maintaining in said solution, a corrosion inhibiting amount of one or more of the thionitrogen compounds set forth in claim 1.

23. A method for inhibiting corrosion of ferrous metal surfaces by aqueous alkanolamine solutions in acid gas removal equipment wherein said solution contains 10 to 50 percent by weight of alkanol amines and contains dissolved acid gases such as carbon dioxide and trace amounts of hydrogen sulfide which comprises maintaining in said solution a corrosion inhibiting amount of one or more of the thionitrogen compounds and one or more of the soluble metal salts set forth in claim 7.

24. The method as set forth in claim 23 wherein the amount of said thionitrogen compounds is from 50 to 1,000 parts per million.

25. The method as set forth in claim 23 wherein the amount of said thionitrogen compounds is in the range from 100 to 300 p.p.m.

* * * * *

UNITED STATES PATENT AND TRADEMARK OFFICE
CERTIFICATE OF CORRECTION

PATENT NO. : 4,431,563
DATED : February 14, 1984
INVENTOR(S) : Leroy S. Krawczyk; Charles W. Martin & Roscoe L. Pearce It is certified that error appears in the above—identified patent and that said Letters Patent is hereby corrected as shown below:

Col. 6, Table III line 24, Example 26; "12.5" should be --12.55--.

Col. 9, line 12; "hydrogen" should be --hydrocarbon--.

Signed and Sealed this

Twenty-eighth Day of August 1984

[SEAL]

Attest:

GERALD J. MOSSINGHOFF

Attesting Officer

Commissioner of Patents and Trademarks